(12) United States Patent
Mere et al.

(10) Patent No.: US 9,323,248 B2
(45) Date of Patent: Apr. 26, 2016

(54) MISSION MANAGEMENT SYSTEM OF AN AIRCRAFT

(71) Applicant: AIRBUS OPERATIONS (SAS), Toulouse (FR)

(72) Inventors: Jean-Claude Mere, Verfeil (FR); Pierre Neri, Tournefeuille (FR); Julien Bernat, Toulouse (FR); Marc Vie, Labarthe sur Leze (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/553,274

(22) Filed: Nov. 25, 2014

(65) Prior Publication Data

US 2015/0148999 A1  May 28, 2015

(30) Foreign Application Priority Data

Nov. 26, 2013 (FR) .................................... 13 61660
Jun. 17, 2014 (FR) .................................... 14 55559

(51) Int. Cl.
*G05D 1/00* (2006.01)
*G08G 5/00* (2006.01)
(Continued)

(52) U.S. Cl.
CPC *G05D 1/00* (2013.01); *G01C 21/00* (2013.01); *G01C 23/00* (2013.01); *G05D 1/0202* (2013.01);
(Continued)

(58) Field of Classification Search
CPC ........ G05D 1/00; G05D 1/0202; H04L 63/08; H04L 43/0823; H04L 67/12; G08G 5/06; G08G 5/003; G08G 5/0039; G08G 5/0021; G08G 5/0034; G01C 21/00; G01C 23/00; G06Q 10/087
See application file for complete search history.

(56) References Cited

U.S. PATENT DOCUMENTS 6,317,659 B1  11/2001  Lindsley et al.
7,436,350 B1  10/2008  Maloratsky et al.
(Continued)

FOREIGN PATENT DOCUMENTS

FR  2 914 995  10/2008
FR  2 922 665  4/2009
FR  2 935 818  3/2010

OTHER PUBLICATIONS

Search Report for FR 1361660, dated Aug. 6, 2014, 2 pages.
(Continued)

*Primary Examiner* — James Trammell
*Assistant Examiner* — James E Stroud
(74) *Attorney, Agent, or Firm* — Nixon & Vanderhye P.C.

(57) ABSTRACT

A mission management system to manage both ground and flight phases of a mission of an aircraft is proposed. The mission management system may be implemented in flight management system architecture with core and supplementary modules distinct from each other. The core module may implement a set of generic functionalities related to a flight management of the aircraft, and the supplementary module may implement supplementary functionalities specific to an entity to which the aircraft belongs. The mission management system may include a flight management unit to define and manage a flight plan and associated flight trajectory, an airport navigation unit to define and manage a ground plan and associated ground trajectory, and a mission management unit to manage a continuity between the ground and flight phases of the mission and prediction computations made by the flight management and the airport navigation units.

14 Claims, 4 Drawing Sheets

(51) Int. Cl.

| | | |
|---|---|---|
| *G05D 1/02* | (2006.01) | |
| *G08G 5/06* | (2006.01) | |
| *H04L 12/26* | (2006.01) | |
| *H04L 29/06* | (2006.01) | |
| *H04L 29/08* | (2006.01) | |
| *G01C 21/00* | (2006.01) | |
| *G01C 23/00* | (2006.01) | |
| *G06Q 10/08* | (2012.01) | |

(52) U.S. Cl.
CPC .............. *G06Q 10/087* (2013.01); *G08G 5/003* (2013.01); *G08G 5/0021* (2013.01); *G08G 5/0034* (2013.01); *G08G 5/0039* (2013.01); *G08G 5/06* (2013.01); *H04L 43/0823* (2013.01); *H04L 63/08* (2013.01); *H04L 67/12* (2013.01)

(56) References Cited

U.S. PATENT DOCUMENTS

| | | |
|---|---|---|
| 7,437,225 B1 | 10/2008 | Rathinam |
| 2003/0093187 A1* | 5/2003 | Walker ............... B64C 13/20 701/1 |
| 2004/0162648 A1 | 8/2004 | Bontrager et al. |
| 2005/0156777 A1* | 7/2005 | King ............... G01S 3/023 342/29 |
| 2007/0032921 A1 | 2/2007 | Allen |
| 2008/0154440 A1 | 6/2008 | Carlton |
| 2008/0243319 A1 | 10/2008 | Coulmeau et al. |
| 2009/0132106 A1* | 5/2009 | DeJonge ............... G05D 1/0661 701/15 |
| 2009/0132107 A1* | 5/2009 | DeJonge ............... G05D 1/0661 701/15 |
| 2010/0145605 A1 | 6/2010 | Valex et al. |
| 2011/0131377 A1 | 6/2011 | Gray et al. |
| 2011/0137495 A1* | 6/2011 | Sacle ............... G05D 1/0676 701/3 |
| 2012/0109424 A1 | 5/2012 | Fervel et al. |
| 2012/0310450 A1* | 12/2012 | Srivastav ............... G08G 5/0021 701/3 |
| 2014/0172204 A1* | 6/2014 | Coulmeau ............ G01C 23/005 701/14 |
| 2014/0183300 A1* | 7/2014 | MacCulloch ......... B64C 39/024 244/1 TD |
| 2014/0257598 A1* | 9/2014 | Bailey ............... G05D 1/101 701/3 |
| 2014/0343760 A1* | 11/2014 | Le Gall ............... G08G 5/02 701/4 |
| 2015/0148996 A1 | 5/2015 | Mere et al. |
| 2015/0148998 A1 | 5/2015 | Mere et al. |

OTHER PUBLICATIONS

French Search Report in FR 1455559 completed Oct. 16, 2014.
U.S. Appl. No. 14/553,191 (Mere et al.) filed Nov. 25, 2014.
U.S. Appl. No. 14/552,822 (Mere et al.) filed Nov. 25, 2014.
Search Report for FR 1453296, dated Sep. 26, 2014, 2 pages.

* cited by examiner

| FROM | TO | | | |
|---|---|---|---|---|
| LFBO | LFMN | | | |

| | | UTC | D | FOB | F |
|---|---|---|---|---|---|
| Departure gate | GATE1 | 13:45 | | 25.0T | |
| | | | 00:04 | | 0.9T |
| Takeoff | LFBO14L | 13:49 | | 25.1T | |
| | | | 00:50 | | 17.0T |
| Landing | LFMN04L | 14:39 | | 8.1T | |
| | | | 00:07 | | 1.4T |
| Arrival gate | GATE2 | 14:46 | | 6.7T | |

Fig. 4

MISSION MANAGEMENT SYSTEM OF AN AIRCRAFT

PRIORITY

This application claims priority to Application No. FR1455559 filed Jun. 17, 2014, which is hereby incorporated by reference in its entirety. This application also claims priority to Application No. FR1361660 filed Nov. 26, 2013, which is hereby incorporated by reference in its entirety.

TECHNICAL FIELD

The technical area of the present disclosure relates to system(s), method(s) and/or apparatus(es) for a management of a mission of an aircraft, for example, a mission management of a transport airplane.

BACKGROUND

In one context, a mission of an aircraft relates to a movement on the ground and/or in flight of the aircraft between two particular positions, while observing a certain number of particular conditions (procedures, airways, time constraints, speed constraints, cruising level, cost index, etc). For a commercial airplane, a mission of that airplane may involve a complete trip from a boarding gate of an airport of departure (or of origin) and a landing gate of an airport of arrival (or of destination).

Thus, mission management involves managing both the navigation in flight (flight phase) and the airport navigation (ground phase). Through the document US-20100145605 (hereby incorporated by reference in its entirety), a device for assisting in the airport navigation of an aircraft is known, the object of which is to perform ground/flight continuity during a movement of the aircraft. This document defines one principle of a flight time prediction from a boarding gate to a landing gate. However, implementing this principle requires a powerful architecture.

SUMMARY

One or more aspects of the disclosed subject matter are directed to managing a mission of an aircraft, such as managing a mission of a commercial airplane, that address one or more shortcomings of conventional system(s), method(s) and/or apparatus(es). In an aspect of the present invention, a novel architecture is proposed to manage a mission of an aircraft. The novel architecture enables managing of both the movement on the ground (ground phase) and in flight of an aircraft (flight phase), and to compute predictions of the mission, which is powerful. The proposed architecture allows while guaranteeing short response times.

An embodiment of the present invention is directed to a mission management system configured to manage a mission of an aircraft. The mission management system may comprise a flight management system (FMS) and an airport navigation unit. The flight management system comprise a flight management unit configured to define and manage a flight plan and an associated flight trajectory for a flight phase of the mission. The airport navigation unit may be configured to define and manage a ground taxiing plan on an airport and an associated taxiing trajectory for at least one ground phase of the mission.

The mission management system may further comprise a mission management (MM) unit linked to the flight management unit and to the airport navigation unit. The MM unit may be configured to manage a continuity between the ground and flight phases of the mission and mission prediction computations.

The flight management system may comprise a core module and a supplementary module. The core module may be configured to implement generic functionalities related to a management of the flight of the aircraft. The supplementary module may be configured to implement specific supplementary functions. The core and the supplementary modules may be linked together by a data exchange interface. The flight management unit may be housed in the core module and/or the mission management unit may be housed in the supplementary module.

Thus, by virtue of the installation of the mission management unit, and of the production of an architecture with dual modules (core and supplementary) specified hereinbelow, an effective architecture is obtained that guarantees efficient response times for managing a mission of an aircraft (namely a movement on the ground and/or in flight of the aircraft between two particular positions) and the computation of predictions of the mission.

Furthermore, in one embodiment, the airport navigation unit may be housed in a human/machine interface (preferably in a display unit of this human/machine interface) linked to the core module. In another embodiment, the airport navigation unit may be housed in a human/machine interface suitable for being linked to the supplementary module.

Moreover, the mission management unit may be configured to distribute and synchronize prediction computations of a mission between the flight management unit and the airport navigation unit, in which the flight management unit is configured to compute predictions of the flight phase of the mission and the airport navigation unit is configured to compute predictions of the ground phase of the mission.

According to one or more embodiments of the present invention, which may be taken together or separately, The flight management unit may be configured to determine a flight trajectory and to compute predictions associated with the flight trajectory, respectively, based on any one or more of an optimum speed, of a minimum speed, and of a maximum speed. The airport navigation unit may be configured to determine at least one taxiing trajectory of the ground phase and to compute predictions associated with the taxiing trajectory, respectively, based on any one or more of an optimum speed, of a minimum speed, and of a maximum speed.

Moreover, in a particular embodiment, the mission management system may comprise a human/machine interface unit configured to enable an operator to modify mission parameters. Preferably, the human/machine interface unit is configured to allow the operator to modify at least one of the following parameters:—an airport of departure; an airport of arrival; a departure gate of the airport of departure; a takeoff runway of the airport of departure; a landing runway of the airport of arrival; an arrival gate of the airport of arrival; a flight or taxiing cost index; a required time at the departure gate, on takeoff, on landing or at the arrival gate; and a quantity of fuel available at the departure gate, on takeoff, on landing or at the arrival gate.

One or more aspects of the present invention may relate also to a method to manage a mission of an aircraft, e.g., using the mission management system as described above. One example method may comprise a step of distributing and synchronizing, via the mission plan management unit, computations of predictions of the mission between the flight management unit and the airport navigation unit, predictions of a flight phase of the mission computed by the flight management unit and predictions of a ground phase of the mission computed by the airport navigation unit.

The method may also comprise:
the flight management unit determining a flight trajectory of the flight phase and computing predictions associated with the flight trajectory, respectively based on any one or more of an optimum speed, of a minimum speed, and of a maximum speed; and
the airport navigation unit determining at least one taxiing trajectory of the ground phase and in computing predictions associated with the taxiing trajectory, respectively based on any one or more of an optimum speed, of a minimum speed, and of a maximum speed.

Aspects of the present invention contemplates a constraint being into any part of the mission of the aircraft. If the constraint is inserted at a takeoff point, the method may further comprise transmitting the inserted constraint to the airport navigation unit to determine the associated constraint on a departure gate point and to display it.

If the constraint is inserted on a part of the flight at a landing point:
if the constraint lies between minimum and maximum values computed for the flight part, then the method may further comprise transmitting the inserted constraint to the flight management unit to adjust a cost index and recompute the predictions, a resulting time estimation on takeoff being defined as a constraint at a takeoff point to secure the downstream flight part and ensure that the constraint is verified; and
if the constraint does not lie within the minimum and maximum values computed for the flight part, then the method may further comprise transmitting the inserted constraint to the flight management unit to adjust a cost index and recompute the predictions, a modified value on takeoff obtained then being entered as a constraint and supplied to the airport navigation unit to constrain the takeoff time according to minimum and maximum values computed for the corresponding taxiing part.

If the constraint is inserted at an arrival gate:
if the constraint lies within computed minimum and maximum values, the method may further comprise defining the value on landing as a constraint to secure the inserted constraint; and
if the constraint does not lie within the computed minimum and maximum values, the method may further comprise transmitting the inserted constraint to the airport navigation unit to recompute the predictions, a modified value on landing obtained then being entered as a constraint and supplied to the flight management unit for an adjustment of the cost index and a new computation of the predictions on the flight part.

This method notably offers the advantage of being simple and easy to implement.

DESCRIPTION OF THE DRAWINGS

The features of the invention mentions above and below, as well as others, will appear more clearly on reading the following description of examples of embodiments, the description being given with reference to the attached figures. In these figures, identical references designate similar elements.

FIG. 4 illustrates an exemplary display on a specific page of parameters, some of which may be modified by an operator (e.g., a pilot).

DETAILED DESCRIPTION

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium—transitory and/or non-transitory—and executed by a computer or processor, whether or not such computer or processor is explicitly shown.

The present description is given with reference to an avionic system that includes a flight management system (referred to as "FMS" in aeronautical language) and an airport navigation system of an aircraft. However, it will be understood that the principles described can be applied to any avionic system.

Below, the following standard specifications may be mentioned: ARINC653 (Avionics Application Standard Software Interface), IMA (Integrated Modular Avionics (part of ARINC653), AFDX (Avionics Full Duplex Switched Ethernet), ARINC429 (Digital Information Transfer System), and ARINC661 (Cockpit Display System). The contents are incorporated by reference in their entirety.

Figure 1:
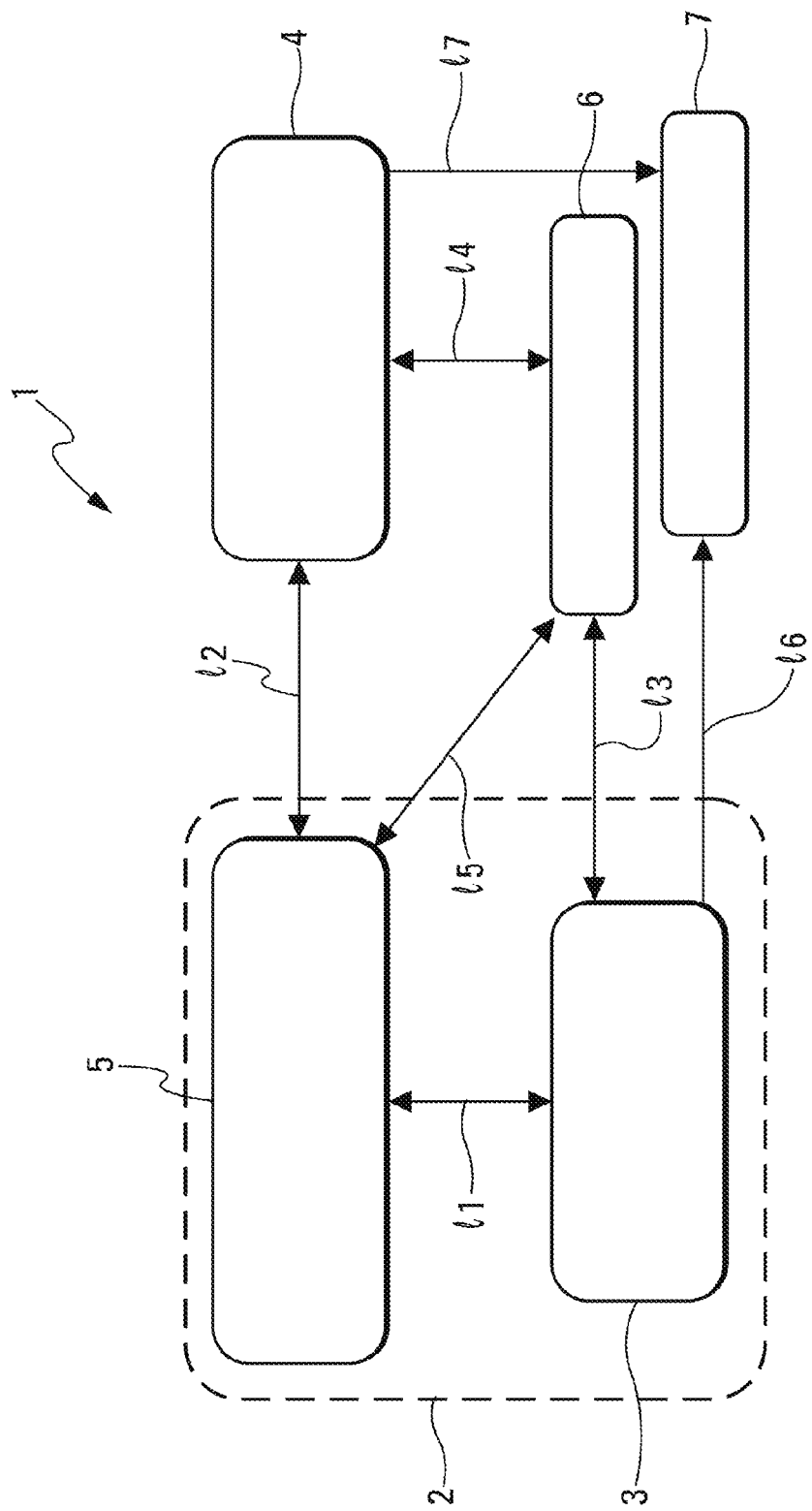
FIG. 1 is a block diagram of an example mission management system according to an embodiment of the present invention.

An example mission management system 1, which is schematically represented in FIG. 1, may be configured to enable management of a mission (in the movement on the ground and in flight) of an aircraft (not shown), such as a transport airplane. In an embodiment, the mission management system 1 may be onboard the aircraft. The example mission management system 1 may comprise a flight management system (FMS) 2 configured to implement one or more functionalities related to a management of the flight of the aircraft. In an aspect, the flight management system 2 may comprise a flight management unit 3 (or flight management function) as seen in FIG. 1. The flight management unit 3 may be configured to define and/or manage a flight plan and/or an associated flight trajectory for a flight phase of a mission. The flight management unit 3 may perform its function based on data entered or otherwise available to the flight management unit 3.

The mission management system 1 may also comprise a ground management system configured to implement one or more functionalities related to managing the aircraft while on the ground. As seen in FIG. 1, the ground management system may comprise an airport navigation unit 4 (or airport navigation function) configured to define and/or manage a ground taxiing plan on an airport and/or an associated taxiing trajectory for a ground phase of the mission. The airport navigation unit 4 may perform its function based on data entered or otherwise made available to the airport navigation unit 3.

The mission management system 1 may further comprise a mission management (MM) unit 5. This mission management unit 5 (also referred to as "Management unit 5") may be linked to the flight management unit 3 (as illustrated by a double link 11 in FIG. 1) and to the airport navigation unit 4 (as illustrated by a double link 12). That is, the mission management unit 5 may be configured to interface or otherwise communicate with the flight management unit 3 and/or the airport navigation unit. The mission management unit 5 may be configured to manage a continuity between the ground and flight phases of the mission and computations of predictions of the mission. In other words, the mission management unit 5 may manage a movement on the ground and/or in flight of the aircraft between two particular positions while observing certain particular conditions.

Figure 2:
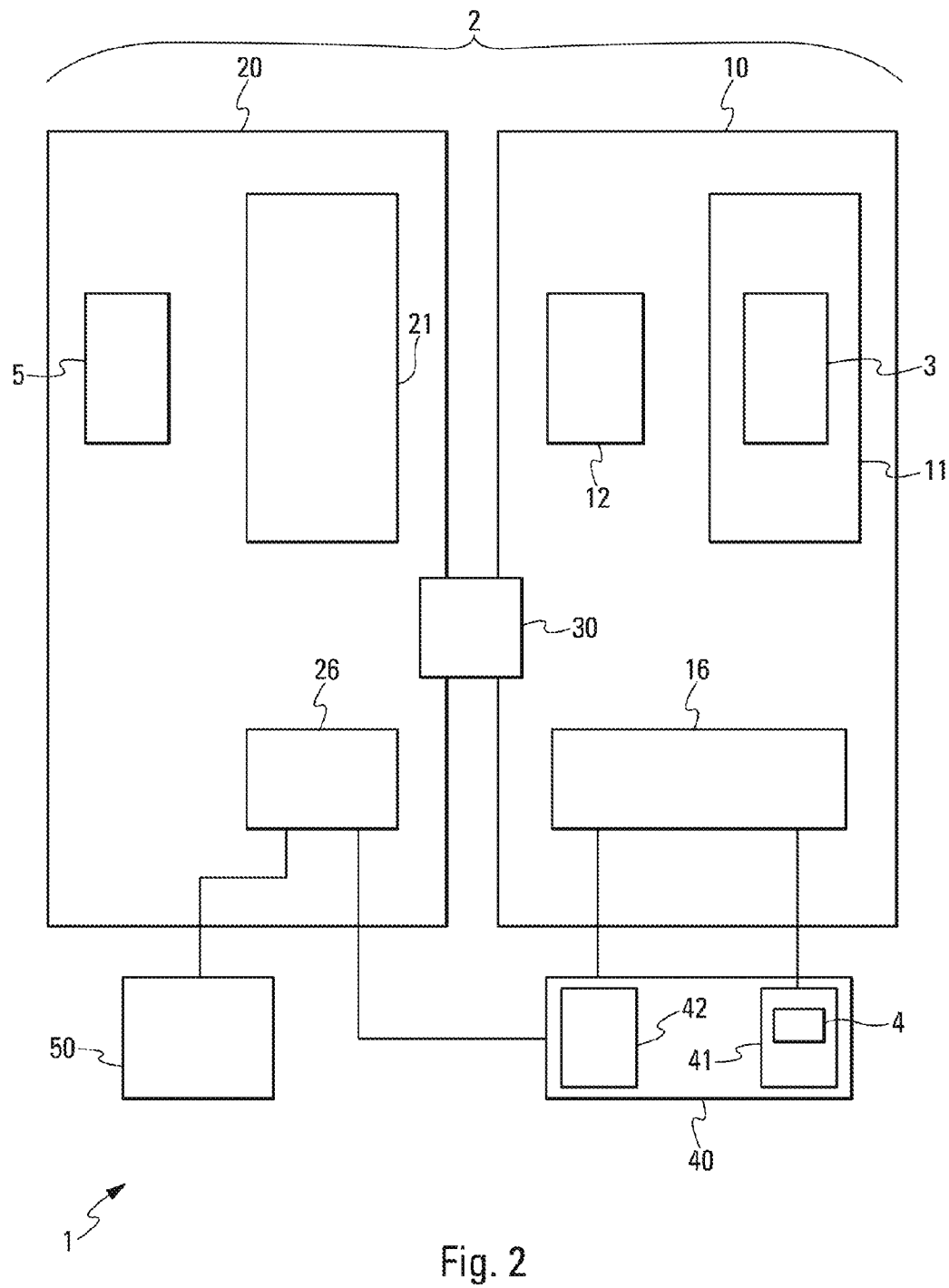
FIGS. 2 and 3 are two example embodiments of a mission management system of the present invention.
Figure 3:
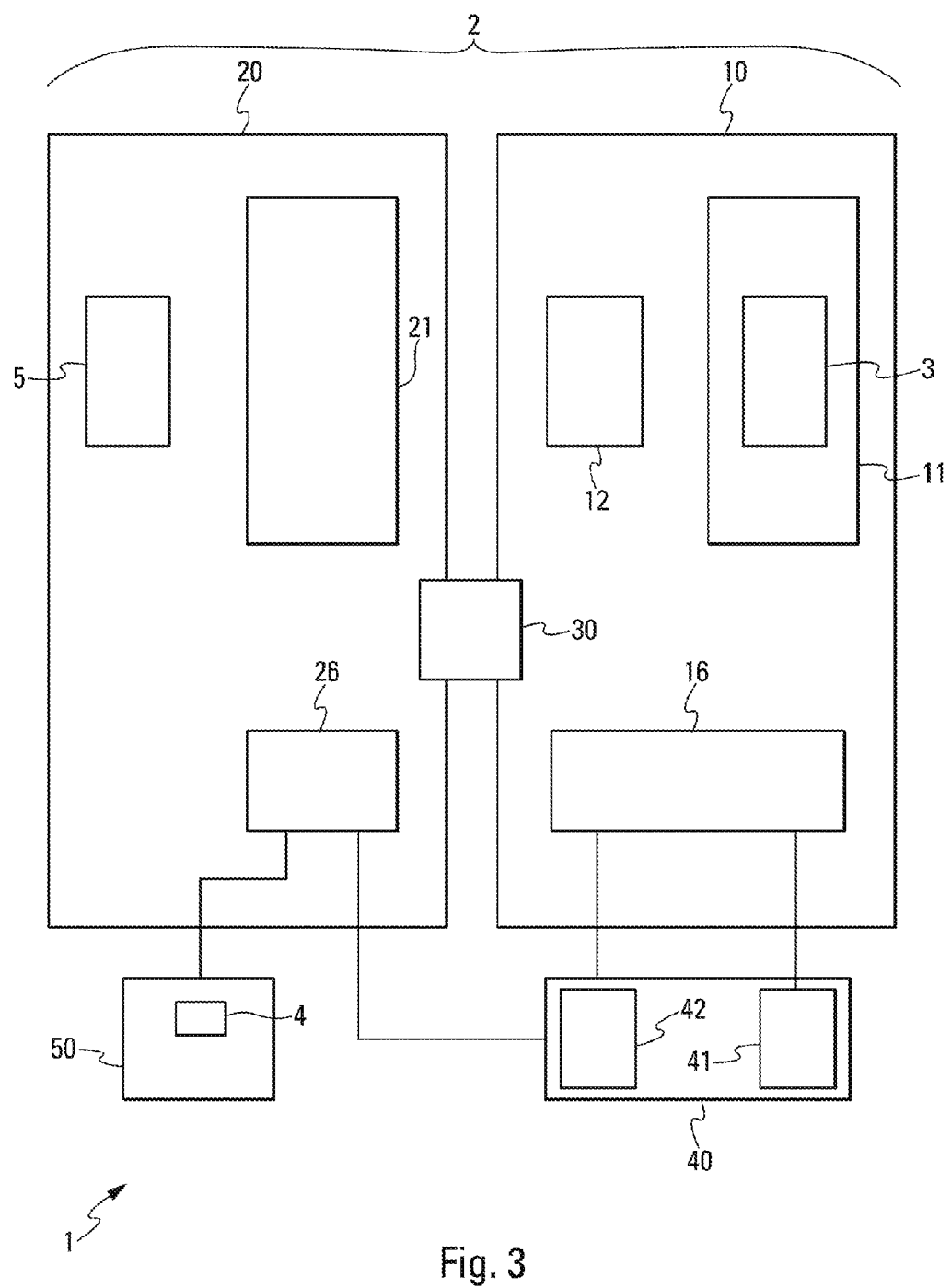

FIGS. 2 and 3 illustrate example architectural embodiments of the flight management system 2 to which the mission management system 1 may be incorporated. As seen, the flight management system 2 may include a core module 10 and a supplementary module 20. The core module 10 (also referred to as the standard module or standard part) may comprise core elements configured to implement core (also referred to as generic) functionalities such as functionalities related to a management of a flight of the aircraft. The supplementary module 20 (also referred to as the specific module or specific part) may comprise supplementary elements configured to implement specific supplementary functionalities.

As illustrated in FIGS. 2 and 3, it is preferred that the core module 10 and the supplementary 20 are distinct, i.e., the modules are separate. For example, the core and supplementary modules 10, 20 may respectively be implemented in core and supplementary partitions in which the two partitions are separate (i.e., distinct) from each other and are in conformity with the ARINC653 standard. In this context, a partition includes software that can be executed in a defined timeslot, segregated from execution timeslots of other partitions (temporal segregation) so that activities in one partition do not affect timing of activities of another partition. The partitions can also be spatially segregated from each other (generally a memory space or input/output space) so as to prevent a partition from accessing a memory space of another partition. These different segregations may be provided by low level logic layers. For example, an operating system may use hardware clocks inside a microprocessor running the partition to provide the temporal segregation. To provide the spatial segregation, the operating system may use mechanisms for controlling access to the physical space (the memory or the input/output space) in question. It is thus seen that the core module 10 and/or the supplementary module 20 may be implemented in hardware or in a combination of hardware and software. This also means that any or all core elements and/or any or all supplementary elements may be implemented in hardware or in a combination of hardware and software.

Still in the ARINC653 context, each partition can be associated with at least one memory sharing communications port, called RAM ports, allowing that partition to exchange messages with the other partitions. This exchange of messages, also referred to as interpartition communication, can be carried out by sampling (Sampling port: the memory associated with the port is updated on each reception of an item of data) or by queuing (Queuing port: the received messages are placed in a queue). These messages, which can be sent and/or received by a port, may include one or more of the following: specific data requests, requests for the execution of functions or of services, event warnings, transfers of specific messages, transfers of files, etc.

The core module 10 and the supplementary module 20 may be linked together by a data exchange interface 30. Through the exchange interface 30, some or all generic functionalities of the core module 10 may communicate with some or all supplementary functionalities of the supplementary module 20. In architectures of FIGS. 2 and 3, the flight management unit 3 is illustrated as being housed in the core module 10 and the mission management unit 5 is illustrated as being housed in supplementary module 20 (as a supplementary application). In other words, the flight management unit 3 may be implemented as a generic/core functionality of the core module 10, and/or the mission management unit 5 may be implemented as a supplementary functionality of the supplementary module 20. Since the functionalities of the core and supplementary modules may be hardware or a combination of hardware and software, the flight management unit 3 and/or the mission management unit 5 may be hardware or a combination of hardware and software.

It should noted however that it is not a requirement for the flight management unit 3 and/or the mission management unit 5 to be housed in the core and/or the supplementary module 10, 20. One or both may be external to the respective modules. However, for the remainder of this document, it may be assumed that the flight and mission management units 3, 5 are housed in the core and supplementary modules 10, 20, respectively unless specifically indicated otherwise.

In an aspect, the management unit 5 may be configured to distribute and synchronize computations of predictions of a mission between the flight management unit 3 and the airport navigation unit 4. The predictions distributed and/or synchronized by the management unit may include flight phase prediction(s) computed by the flight management unit 3 and/or ground phase prediction(s) computed by the airport navigation unit 4.

Thus, by virtue, on the one hand, of the installation of the management unit 5 to manage the continuity between the ground and flight phases, and, on the other hand, of the production of an architecture with dual modules (core and supplementary), an effective architecture is obtained that guarantees efficient response times for managing a mission of an aircraft (namely a movement on the ground and/or in flight of the aircraft between two particular positions) and the computation of the predictions of the mission.

In both FIGS. 2 and 3, the airport navigation unit 4 (configured to manage a taxiing of the aircraft) is illustrated to be external to flight management system 2. It should be noted that it is not a requirement for the airport navigation unit 4 to be external. However, for the remainder of this document, it may be assumed that the airport navigation unit is external to the flight management system 2 unless specifically indicated otherwise.

In the embodiment illustrated in FIG. 2, the airport navigation unit 4 may be incorporated in an avionics part of the mission management system 1. For example, it may be housed or otherwise incorporated in a generic human/machine interface 41 (e.g., in a module of LRU type of a display) linked to the core module 10. In the embodiment illustrated in FIG. 3, the airport navigation unit 4 (or airport navigation function or application) may be housed or otherwise incorporated in a specific human/machine interface 50, for example in a portable computer. One such portable computer is a computer of an electronic flight kit of EFB (Electronic Flight Bag) type, which is suitable for being connected to the supplementary module 20 or to the core module 10. The airport navigation unit 4 may be implemented in hardware or in a combination of hardware and software.

Regarding the embodiment of FIG. 3, it may be assumed that the supplementary module 20 is configured to implement a flight plan transmission functionality to transmit the flight plan to this portable computer. The flight plan transmission functionality, which in this instance is a supplementary functionality, may be provided as a main application which, when executed, implements the flight plan transmission functionality. To implement a continuity of the ground and flight parts at a display level (on one and the same screen), this main application may be added into the supplementary module 20 (or an application is added into the EFB device) which receives the flight plan from the core module 10 and displays it on the same screen on which the airport navigation unit 4 displays the taxiing plan.

In structures with dual modules such as those illustrated in FIGS. 2 and 3, the core module 10 of the flight management system 2 may be configured to implement a set (one or more) 11 of functionalities related to the management of the flight of the aircraft (e.g., the flight plan management, the fuel management, etc.). Thus, the functionalities 11 may be viewed as the generic/core functionalities of the core module 10. Recall that the core module 10 may comprise core elements configured to implement the generic functionalities. In an embodiment, each generic functionality 11 may be implemented through a corresponding core element. These generic functionalities may be either generic basic functions of the flight management system, or functional services that are also generic to the flight management system. These functional services may use one or more generic functions clocked by an operating system (not shown). The flight management unit 3 as described above can be a part of the generic functionalities 11, as seen in FIGS. 2 and 3. In other words, the flight management unit 3 may be viewed as being one of the generic functionalities implemented by the core module 10 (e.g., implemented by a flight management element).

The supplementary module 20 may be configured to implement a set (one or more) 21 of supplementary functionalities which are specific to an entity to which the aircraft belongs, such as a specific aircraft model, an aircraft family, an airline, an alliance, all or part of a fleet, and so on. Recall that the supplementary module 20 may comprise supplementary elements configured to implement the supplementary functionalities. In an embodiment, each supplementary functionality 21 may be implemented through a supplementary core element. These supplementary functionalities may be new functions compared to the generic functions of the core module 10, or alternative functions to the generic functions of the core module 10 to which they add behavioral modifications, or provide supplementary services so as to supplement the services of the core module 10 which use one or more of these supplementary functions.

The core module 10 may include a core interface 16 configured to interface with an embedded (on-board) system 40 to thereby enable the core module 10 to communicate with the embedded system 40 of the aircraft. The embedded system 40 may comprise at least one generic human/machine interface 41 and one or more embedded (on-board) devices 42 such as those routinely installed in an aircraft including flight instruments, sensors, etc. Thus, through the core interface 16, any or all generic functionalities 11 . . . 1*n* may communicate with the generic man-machine interface 41 and/or with any or all embedded device(s) 42. In an embodiment, the core interface 16 may be provided as a core interfacing application which, when executed, implements a core interfacing functionality that allows the core module 10 to interface with the embedded system 40.

The supplementary module 20 may also include a supplementary interface 26 configured to interface with the exchange interface 30 to thereby allow the supplementary module 20 to communicate with the core module 10. Thus, through the supplementary interface 26, any or all supplementary functionalities 21 may communicate, via the exchange interface 30, with any or all generic functionalities 11. Note that through the exchange interface 30 and the core interface 16, the supplementary module 10 may communicate with the generic human/machine interface 41, i.e., any or all supplementary functionalities 21 may communicate with the generic human/machine interface 41 via the exchange interface 30 and the core interface 16. Alternatively or in addition thereto, the supplementary interface 26 may be configured to interface with the embedded system 40 without going through the exchange interface 30. In this way, the supplementary interface 26 can allow the supplementary functionalities 21 to communicate directly with the embedded system 40 (with the generic man-machine interface 41 and/or the embedded device(s) 42).

The supplementary interface 26 may further be configured to interface with the specific human/machine interface 50 specific to the supplementary module 20. The generic and/or the specific human/machine interfaces 41, 50 can may comprise any combination of screens (wide, touch, etc.), keyboards, mice, trackballs, head-up viewing systems, augmented reality systems, etc, and notably enables the crew to enter data. In an embodiment, the supplementary interface 26 may provided as a supplementary interfacing application which, when executed, implements a supplementary interfacing functionality that allows the supplementary module 20 to interface with the exchange interface 30 and/or with the embedded system 40.

The core 10 and supplementary 20 modules may communicate with one another, for example, through an AFDX ("Avionics Full Duplex Switched Ethernet") network, an Ethernet network or an ARINC429 (Digital Information Transfer System) network, or via a RAM port or a shared memory.

The core module 10 can further comprise a set of elements 12 configured to implement a database and/or a maintenance functionality.

By virtue of this structure with two distinct modules, the supplementary elements/functionalities of the supplementary module 20 may be incorporated into the flight management system 2 without requiring any modification of the generic functionalities/elements of the core module 10 and, thereby, use only the functions and functional services of said core module which it offers (in this case the generic functionalities of the flight management system). Also, these supplementary functionalities can be developed independently of the core module 10.

From one perspective, the airport navigation unit 4 of the mission management system 1 may be viewed as having a role for the ground phase of mission that is equivalent to the role of the flight management unit 3 for the airborne phase, e.g., defining and managing taxiing plans and taxiing trajectories of the aircraft.

Moreover, it may be assumed that functionalities are implemented both in the flight management unit 3 and in the airport navigation unit 4, to compute minimum and maximum values for each phase of the mission, as well as logics (for example in the flight management unit 3, in the airport navigation unit 4, and/or in the management unit 5) to manage constraints or conditions inserted into the mission. Each of the units should be capable of performing new computations on its part (ground or flight) with a different speed to satisfy each constraint on another part (ground or flight).

The flight management unit 3 and the airport navigation unit 4 should be responsible for displaying the parts of the flight and on the ground of each trajectory. Preferably, the mission management unit 5 need only to manage the continuity predictions based on minimum and maximum time information, compiled by the flight management unit 3 and the airport navigation unit 4 at hinge points of the mission (ground/flight transitions).

Preferably, the management unit 5 is configured to provide management of monitoring of continuity and of consistency between the different parts of the mission and of the mission trajectory. The management unit 5 thus may be configured to perform an adaptation and/or a synchronization between the flight management unit 3 and the airport navigation unit 4.

Referring back to FIG. 1, the mission management system 1 may further comprise a display 6 which linked to the units 3, 4 and 5, respectively by the double links 13, 14 and 15, i.e., the display 6 may be configured to communicate with any of the flight management unit 3, the airport navigation unit 4 and the mission management unit to thereby display information provided by these units.

The mission management system 1 may additionally comprise a guiding unit 7 linked to the units 3 and 4 respectively by the links 16 and 17, i.e., the guiding unit 7 may be configured to communicate with the flight management unit 3 and/or the airport navigation unit 4. The guiding unit 7 can comprise an automatic piloting system. Preferably, the automatic piloting system may be put in a managed mode (that is to say, it follows the flight plan of the flight management unit 3). Guiding instructions may be transmitted to the guiding unit 7 to keep the aircraft on the trajectory (from the position of the aircraft and the route deviation).

Regarding the display 6, can comprise a cockpit screen, such as a screen of ND ("Navigation Display") type or of MFD ("Multi Function Display") type, which is associated with a human/machine interface unit such as a keyboard, to interact with the screen. If the airport navigation unit 4 is housed in the generic human/machine interface 41 as seen in FIG. 2, the display 7 may be assumed to comprise a screen of this generic human/machine interface 41. If the airport navigation unit 4 is housed in the specific human/machine interface 50 as seen in FIG. 3, the screen of the display 7 corresponds to a screen of the EFB device or one of the screens of the interfaces 41 of the cockpit.

The example mission management system 1 described above offers at least the following advantages: simplicity, flexibility, enhanced efficiency, and minimal impact on the flight management unit 3 and on the existing airport navigation unit 4.

In an embodiment, for each taxiing part (from a gate to a runway or vice versa) of the mission (on the airport of departure or of arrival), the airport navigation unit 4 may be configured to define the taxiing plan. The taxiing plan may be defined based on input from the crew and/or data received from the ground (from air traffic control). The crew can load a predefined route into a database, or enter a list of surface elements of the airport (gate, runway, taxiing lane, etc.) stored in a database.

Generally, there is no automatic transition between the flight management unit 3 and the airport navigation unit 4: the information from the flight management unit 3 and the airport navigation unit 4 is displayed on the screen exclusively of one another upon a command from the crew. That is, in conventional avionics systems, the flight management unit and the airport navigation unit operate independently of each other.

However, one or more aspects of the present invention makes it possible to manage the continuity of the different phases (ground/in the air) of the mission without transition, even automatically, and to provide a continuous display by presenting both ground and flight information on the same screen with no display discontinuity.

In the case of a movement from a boarding gate to a landing gate for example, the airport navigation unit 4 is responsible, for each of the two parts of the ground phase (the taxiing before takeoff and the taxiing after landing), for computing the taxiing trajectory corresponding to the taxiing plan in effect. The taxiing plan may be selected by the crew and/or may be updated automatically by the use of a communication from the ground to the aircraft. To enable such capabilities, the airport navigation unit 4 may be configured to determine at least one ground taxiing trajectory of a ground phase, and to compute predictions associated with each taxiing trajectory. Each trajectory and the associated predictions may be based on a speed of the aircraft corresponding to that trajectory. For example, a trajectory and predictions maybe based an optimum speed, another trajectory and predictions may be based on a minimum speed, and yet another trajectory and predictions may be based on a maximum speed.

Preferably, the computation of the taxiing trajectory includes at least two distinct computations—one each for minimum and maximum time estimations, based on two predefined taxiing speeds. Also a third computation may be made based on a usual operational speed for a more realistic estimation. The usual operational speed may be predefined and/or originate from a cost index CI, supplied for example by the core module 10 of the flight management system 2. Of course, computations may be made based on more than one intermediate speed. Types of computations (not exhaustive) that the airport navigation unit 4 may make include the estimated times of arrival (ETA), minimum and maximum, and the estimated quantity of fuel on board EFOB (Estimated Fuel On Board), at the last point of each taxiing phase, based on the maximum and minimum speeds and/or of the estimated time of arrival ETA and/or of the required time of arrival RTA at the first point of the taxiing phase concerned. Note that ETA(s) based on intermediate taxiing speed(s) as well as EFOBs corresponding to the intermediate speed(s) may be computed as well.

Thus, with regard to the ground phase the airport navigation unit 4 may compute the time t (e.g., ETA) for each taxiing phase by integrating the mechanics equation for the point t=d/v (distance d over speed v) over the entire taxiing phase, the distance d being set (length of the path followed). For each speed, a duration may be obtained, and therefore an estimated schedule to reach a particular point corresponding to the speed may also be obtained. For example, assume that three speeds—min, max, usual—are selected. From these three speeds concerned, three durations can be obtained, therefore three estimated schedules may be obtained for reaching an end-of-taxiing point (last point of the taxiing phase concerned). It is contemplated that the time computation can involve more complicated integrations with more complex speed profiles (turns, etc.).

For computation involving the fuel in the ground phase, the airport navigation unit 4 may determine the quantity of fuel consumed per unit of time, as a function of the speed. By aggregating all these quantities over the duration of the taxiing phase, the airport navigation unit 4 may obtain the fuel consumption is obtained and thus deduce therefrom the quantity of fuel remaining at the end-of-taxiing point. In an embodiment, the airport navigation may consult a fuel consumption table providing values for fuel consumption quantity per unit time as a function of the speed. The fuel consumption table may be incorporated into or otherwise made available to the airport navigation unit 4.

For the flight phase, it is suitable, usually, to integrate the flight mechanics equations. Preferably, the computation is not performed only for a single speed hypothesis (the optimum speed for the cost index CI entered) as in the usual situation, but is performed for at least three different speeds (or three different cost indices: minimum index, maximum index and index entered by the crew). The cost parameter or index CI entered by the crew at the start of the flight makes it possible to establish a ratio to be followed between the time-dependent costs and costs linked to the fuel consumption.

Thus, the mission management system 1 may be configured to compute the trajectory of the mission and the associated predictions based on an optimum (e.g., an intermediate) speed. Preferably, the mission management system 1 also performs two other computations, one at the minimum speed and the other at the maximum speed, to determine ranges of possibilities of the aircraft (minimum and maximum capacity in terms of travel time, quantity of fuel for each part of the mission) in order to be able to manage any time and/or fuel constraints inserted by the crew and to adapt to the speed on each part of the mission to satisfy these constraints.

In an embodiment, the airport navigation unit 4 may be configured to enable the crew and/or the management unit 5 to insert one or more time constraints on the first and/or last points of each taxiing plan. The airport navigation unit 4 may:
  estimate the duration of each taxiing part;
  compute the required departure time of the taxiing part, based on one or more time constraints at the takeoff point (the takeoff point time constraint(s) may be inserted directly by the crew and/or may be computed by the management unit 5 based on one or more downstream constraints); and
  estimate the time of arrival at the destination gate, based on one or more time constraints at the landing point (the landing point time constraint(s) may be inserted directly by the crew) and/or based on an estimated landing time (the estimated landing time may be supplied by the management unit 5).

Preferably, the mission management system 1 enable crew insert constraints to each part of the plan to perform the mission. Thus, when appropriate, the management unit 5 may request the airport navigation unit 4 and/or the flight management unit 3 to recompute the predictions by imposing a speed that is different from the optimum speed to observe constraints (time or fuel) more downstream in the mission. If no constraint is defined in the mission, the required departure time for the taxiing part may be left to the crew and/or deduced from the current time.

In one or more aspects, the flight management unit 3 is responsible, for each flight part of the mission (from a first point to a second point), to define the flight plan, which may be based on input from the crew and/or based on information received by a communication from the ground (from air traffic control). The crew may load a predefined route into a database. The flight management unit 3 may also be configured to compute the flight trajectory corresponding to the selected flight plan (e.g., selected by the crew) and/or the trajectory corresponding to the flight plan updated automatically by a communication from the ground to the aircraft. The flight management unit 3 may further be configured to compute predictions associated with the flight trajectory, based on the aircraft speed (e.g., based on any or all of an optimum speed, of a minimum speed, and of a maximum speed). Note that more than one intermediate flight speed is contemplated.

Preferably, the computation of the flight trajectory includes at least two distinct computations—one each for minimum and maximum time estimations, based on two predefined flight speeds. Also a third computation may be made based on a usual operational speed for a more realistic estimation. The usual operational speed may be predefined or originate from the cost index CI supplied by the core module 10 of the flight management system 2. Of course, the computations may be made based on more than one intermediate speed. Types of computations (not exhaustive) that the flight management unit 3 may make include the minimum and maximum ETA times and the EFOB quantity at the final point of each flight phase, based on the maximum and minimum speeds and the ETA or RTA time at the first point of the flight phase concerned. Note that ETA times based on intermediate flight speed(s) as well as EFOBs corresponding to the intermediate speed(s) may be computed as well.

In an embodiment, the flight management unit 3 may be configured enable the crew and/or the management unit 5 to insert one or more time constraints on the first and/or last points of each flight plan. The flight management unit 3 may:
  estimate the duration of each flight part;
  compute the required departure time of the flight part (e.g., first point of the flight part), based on one or more time constraint on takeoff (or at another point) (the time constraint(s) may be entered directly by the crew and/or may be computed by the management unit 5 based on one or more downstream constraints; and
  estimate the time of arrival at the destination point of the flight part, based on one or more time constraints (the time constraints may be entered directly by the crew) and/or based on the estimated landing time (or another time) (the estimated landing time and/or another time may be supplied by the management unit 5).

If no constraint is defined in the mission, the required departure time at the first point may be left to the crew and/or deduced from the current time.

The management unit 5 may be configured to generate a mission for the aircraft at least for a display by a screen on a specific page. On this specific page, some or all parts of the mission can be displayed in the form of a list of waypoints, based on concatenation:
  of the departure taxiing plan (if the aircraft is still in the pre-flight phase) supplied by the airport navigation unit 4;
  of the flight plan (if the aircraft has not yet landed) supplied by the flight management unit 3; and
  of the arrival taxiing plan supplied by the airport navigation unit 4.

The complete mission (all three parts) thus defined may be available for the display. However, just one part (or section of one part) may be active at a given moment for guidance. When the last section of a part has been sequenced, the first section of the next part can be activated.

In the context of the present invention, the usual interfaces may display of each part of the mission associated with each unit (flight management unit 3 and airport navigation unit 4). This architecture is advantageous, because it avoids the latency regarding the concatenation performed by the management unit 5.

The management unit 5 may be accessible via the specific page displayed on a screen (ND, MFD) of the cockpit. This page preferably provides a view of the most important information both for the taxiing and for the flight phases, as represented by way of illustration in FIG. 4. The page should display and allow the modification of any one or more of the following parameters:

- the airport of departure or of origin ("FROM": e.g., "LFBO" in FIG. 4) and the airport of arrival or of destination ("TO": e.g., "LFMN");
- the departure gate ("Departure gate": e.g., "GATE 1") out of the gates associated with the airport of origin;
- the takeoff runway ("Takeoff": e.g., "LFBO14L") out of the runways associated with the airport of origin;
- the landing runway ("Landing": e.g., "LFMNO4L") out of the runways associated with the airport of destination;
- the arrival gate ("Arrival gate": e.g., "GATE2") out of the gates associated with the airport of destination;
- a flight and/or taxiing cost;
- a time of arrival at the departure gate, on takeoff, on landing and at the arrival gate; and
- a quantity of fuel on board at the departure gate, on takeoff, on landing or at the arrival gate.

This specific page may therefore be displayed on a human/machine interface unit which enables an operator to modify certain parameters of the mission. The page in FIG. 4 displays the summary information of each of the component parts of the mission:

- UTC: predicted time at the departure gate ("Departure gate"), on takeoff ("Takeoff"), on landing ("Landing") and at the arrival gate ("Arrival gate");
- FOB: the quantity of fuel on board predicted at the departure gate, on takeoff, on landing and at the arrival gate;
- D: the duration of the departure taxiing phase, of the flight phase and of the arrival taxiing phase. As an illustration, for the flight phase (between the takeoff and landing), the duration D represents 50 minutes ("00:50") in the example of FIG. 4; and
- F: the predicted quantity of fuel used during the departure taxiing phase, the flight phase and the arrival taxiing phase. As an illustration, for the flight phase, the predicted quantity of fuel used F represents 17 tons ("17.0 T") in the example of FIG. 4.

In particular, to be able to adapt the progress of the mission (speed it up for example) to the constraints encountered (delay, air traffic management), the mission management system 1 may be configured to provide the crew with an option to insert time and/or fuel constraints at one or more of the following four points: departure gate, takeoff, landing, and arrival gate.

The mission management system 1 as described above makes it possible to accurately compute the flight predictions of an aircraft, from the boarding gate to the landing gate, even in the case of a flight plan revision. It makes it possible to manage constraints entered at each part of the mission, synchronizing the various parts via the management unit 5. The mission management system 1 may implement a method that makes it possible to perform the synchronization, which is simple and easy to implement, through an exchange of minimum/maximum parameters instead of complete taxiing and flight plans. Example operations of the mission management system 1 are described hereinbelow for various parameter modifications.

A modification of the airport of origin or of destination on the specific page by the crew can lead to both the flight plan (flight management unit 3) and the taxiing plan (airport navigation unit 4) being updated:

- the flight management unit 3 (of the core module 10 of the flight management system 2) may manage the modification of the airport of origin or of destination; and
- regarding the airport navigation unit 4, the taxiing plan and the associated taxiing trajectory (on the airport of origin or of destination) may be deleted until a runway and/or a gate is defined on this airport.

A modification of the departure and/or of the arrival gate on the specific page may impact the taxiing plan. The airport navigation unit 4 may recompute the new taxiing plan and the taxiing trajectory. The airport navigation unit 4 may also export the computation(s) to the management unit 5.

A modification of the departure and/or of the arrival runway on the specific can impact the taxiing plan and/or the flight plan:

- the airport navigation unit 4 may recompute the new taxiing plan and the associated taxiing trajectory, and may also export the computation(s) to the management unit 5;
- the flight management unit 3 (of the core module 10 of the flight management system 2) may modify the flight plan and the associated flight trajectory, and may also export the modification(s) to the management unit 5.

Furthermore, an insertion of time and/or fuel constraint(s) into any part of the mission should be propagated to all the preceding parts. If a constraint is inserted or otherwise defined at the takeoff point, this constraint should be transmitted to the airport navigation unit 4 to determine and display the associated constraint on the departure gate point.

If the time/fuel constraint is entered on a part of the flight or at the landing point, then different actions may be taken depending on the constraint value:

- if the constraint lies between the minimum and maximum values computed for the flight part, the constraint may be transmitted or otherwise provided to the flight management unit 3, to adjust the cost index CI and to recompute the predictions. The resulting time estimation on takeoff (if the aircraft is not yet in the air), may be defined or otherwise provided as a constraint at the takeoff point to secure the downstream flight part and ensure that the constraint is verified;
- if the constraint does not lie within the minimum and maximum values computed for the flight part, the constraint may be transmitted to the flight management unit 3, to adjust the cost index CI and recompute the predictions. The resulting modified value on takeoff may be inserted or otherwise provided as a constraint to the airport navigation unit 4 so as to constrain the takeoff time according to the minimum and maximum values computed for the corresponding taxiing part.

If the time/fuel constraint is entered at the arrival gate, then different actions may be taken depending on the constraint value:

- if the constraint lies within the computed minimum and maximum values, the value on landing may be defined as a constraint to secure the constraint entered;
- if the constraint does not lie within the computed minimum and maximum values, this constraint may be transmitted to the airport navigation unit 4 to recompute the predictions. The resulting modified value on landing may be entered as a constraint transmitted to the flight management unit 3 for an adjustment of the cost index CI and a new computation of the predictions on the flight part.

In the example presented below, it is assumed that an operator, e.g., the pilot, adds a fuel constraint. This entry may also be applied as a time constraint. In effect, the pilot enters a fuel value on a point of the flight plan, the mission management system 1 may vary the speed (via the cost index) along the trajectory iteratively to make the computation of the predictions converge on this fuel value. The fuel constraints can be entered in a dedicated page, as for the time constraints.

The management unit 5 which receives the constraint and the minimum and maximum values of the times and the quantity of fuel at the hinge points of the mission may request the flight plan management and the airport navigation units 3 and 4 to recompute the predictions on their respective phases of the mission with a different speed hypothesis to observe the constraint. The flight plan may not change, but the predictions at each point may change to observe the entered constraint.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, the terms "a" or "one" do not exclude a plural number and the term "or" means either or both. Furthermore, characteristics or steps which have been described with reference to one of the above exemplary embodiments may also be used in combination with other characteristics or steps of other exemplary embodiments described above.

The invention claimed is:

1. A mission management system configured to manage a mission of an aircraft, the mission management system being located onboard the aircraft and comprising:
   a flight management system comprising a flight management unit, the flight management unit being configured to define and manage a flight plan and an associated flight trajectory for a flight phase of the mission;
   an airport navigation unit configured to define and manage a ground taxiing plan on an airport and an associated taxiing trajectory for at least one ground phase of the mission; and
   a mission management unit linked to the flight management unit and to the airport navigation unit and being configured to manage a continuity between the ground and flight phases of the mission and mission prediction computations,
   wherein said flight management system has an architecture comprising:
      a core module configured to implement generic functionalities related to the management of the flight of the aircraft;
      a supplementary module distinct from the core module and configured to implement specific supplementary functions different from the generic functionalities implemented by the core module;
      a data exchange interface configured to link together the core and supplementary modules, and
   wherein the flight management unit is housed in the core module and the mission management unit is housed in the supplementary module.

2. The mission management system as claimed in claim 1, wherein the airport navigation unit is housed in a generic human/machine interface linked to the core module.

3. The mission management system as claimed in claim 1, wherein the airport navigation unit is housed in a specific human/machine interface suitably linked to the supplementary module.

4. The mission management system as claimed in claim 1, wherein the mission management unit is configured to distribute and synchronize prediction computations of the mission between the flight management unit and the airport navigation unit, and
   wherein the flight management unit is configured to compute predictions of the flight phase of the mission and the airport navigation unit is configured to compute predictions of the ground phase of the mission.

5. The mission management system as claimed in claim 1, wherein the flight management unit is configured to determine the flight trajectory and to compute predictions associated with the flight trajectory, respectively based on an optimum flight speed, a minimum flight speed, and a maximum flight speed.

6. The mission management system as claimed in claim 1, wherein the airport navigation unit is configured to determine at least one taxiing trajectory of the ground phase and to compute predictions associated with the taxiing trajectory, respectively based on an optimum ground speed, a minimum ground speed, and a maximum ground speed.

7. The mission management system as claimed in claim 1, further comprising a human/machine interface unit configured to enable an operator to modify mission parameters.

8. The mission management system as claimed in claim 7, wherein the interface unit is configured to allow the operator to modify at least one of the following parameters:
   an airport of departure;
   an airport of arrival;
   a departure gate of the airport of departure;
   a takeoff runway of the airport of departure;
   a landing runway of the airport of arrival;
   an arrival gate of the airport of arrival;
   a flight and/or taxiing cost index;
   a required time at the departure gate, on takeoff, on landing and/or at the arrival gate; and
   a quantity of fuel available at the departure gate, on takeoff, on landing and/or at the arrival gate.

9. A method of operating a mission management system to manage a mission of an aircraft, the mission management system being located onboard the aircraft and comprising a flight management system comprising a flight management unit, an airport navigation unit, and a mission management unit linked to the flight management unit and to the airport navigation unit, the method comprising:
   distributing and synchronizing, by the mission management unit, computations of predictions of the mission between the flight management unit and the airport navigation unit,
   wherein predictions of a flight phase of the mission are computed by the flight management unit and predictions of a ground phase of the mission are computed by the airport navigation unit.

10. The method as claimed in claim 9, further comprising:
    the flight management unit determining a flight trajectory of the flight phase and computing predictions associated with the flight trajectory, respectively based on an optimum flight speed, a minimum flight speed, and a maximum flight speed; and
    the airport navigation unit determining at least one taxiing trajectory of the ground phase and computing predictions associated with the taxiing trajectory, respectively based on an optimum ground speed, a minimum ground speed, and a maximum ground speed.

11. The method as claimed in claim 9, further comprising:
upon an insertion of a takeoff point constraint, which is a constraint inserted at a takeoff point, transmitting the takeoff point constraint to the airport navigation unit to determine and display an associated constraint on a departure gate point;
upon an insertion of a landing point constraint, which is a constraint inserted on a part of the flight at a landing point:
- if the landing point constraint lies between minimum and maximum values computed for the flight part, transmitting the landing constraint to the flight management unit to adjust a cost index and recompute the predictions, a resulting time estimation on takeoff being defined as a constraint at a takeoff point to secure a downstream flight part and ensure that the constraint is verified; and
- if the landing point constraint does not lie within the minimum and maximum values computed for the flight part, transmitting the landing point it to the flight management unit to adjust a cost index and recompute the predictions, a modified value on takeoff obtained then being entered as a constraint and supplied to the airport navigation unit to constrain a takeoff time according to minimum and maximum values computed for a corresponding taxiing part; and upon an insertion of an arrival gate constraint, which is a constraint is inserted at an arrival gate:
- if the arrival gate constraint lies within computed minimum and maximum values, defining the value on landing as a constraint to secure the constraint entered; and
- if the arrival gate constraint does not lie within the computed minimum and maximum values, transmitting the arrival gate constraint to the airport navigation unit to recompute the predictions, a modified value on landing obtained then being entered as a constraint and supplied to the flight management unit for an adjustment of the cost index and a new computation of the predictions on the flight part.

12. The mission management system as claimed in claim 1, wherein the supplementary functions are new functions compared to the generic functionalities of the core module, alternative functions to the generic functionalities of the core module to which the supplementary functions add behavioral modifications, and/or which provide supplementary services so as to supplement services of the core module which uses one or more of the supplementary functions.

13. The mission management system as claimed in claim 1, wherein the supplementary functions are specific to an entity to which the aircraft belongs.

14. The mission management system as claimed in claim 13, wherein the supplementary functions specific to an entity to which the aircraft belongs include a specific aircraft model, a family of aircraft, a company, an alliance and/or all or part of a fleet of aircraft.

* * * * *